United States Patent
Curwood

(10) Patent No.: US 6,243,929 B1
(45) Date of Patent: Jun. 12, 2001

(54) JOINER

(76) Inventor: Christopher James Curwood, 2 College Street, Wendouree (AU), 3355

( * ) Notice: Subject to any disclaimer, the term of this patent is extended or adjusted under 35 U.S.C. 154(b) by 0 days.

(21) Appl. No.: 09/463,260

(22) PCT Filed: Jun. 1, 1999

(86) PCT No.: PCT/AU99/00421

§ 371 Date: Jan. 21, 2000

§ 102(e) Date: Jan. 21, 2000

(87) PCT Pub. No.: WO99/63854

PCT Pub. Date: Dec. 16, 1999

(30) Foreign Application Priority Data

Jun. 5, 1998 (AU) .................................................. PP3937

(51) Int. Cl.[7] .................................................. A44C 11/00
(52) U.S. Cl. .............................. 24/598.2; 70/459; 59/85; 63/3.1
(58) Field of Search .............................. 24/598.2, 573.5, 24/575, 703.1; 403/348, 349; 63/3.1; 70/459, 458, 457; 59/84, 85

(56) References Cited

U.S. PATENT DOCUMENTS

| 195,940 | * | 10/1877 | Martin .............................. 24/598.2 X |
| 309,162 | * | 12/1884 | Pusheck .................................. 70/459 |
| 320,792 | * | 6/1885 | Jopson .................................... 70/459 |
| 755,473 | * | 3/1904 | Erb, Jr. ............................... 70/459 X |
| 2,856,661 | | 10/1958 | Holl . |
| 3,427,823 | * | 2/1969 | Musillo .................................. 63/3.1 |
| 3,877,250 | * | 4/1975 | Musillo ............................... 59/85 X |
| 5,628,095 | * | 5/1997 | Appel et al. ............................. 24/575 |

FOREIGN PATENT DOCUMENTS

| 25 13 985 | 10/1976 | (DE) . |
| 275822 A1 | 7/1988 | (EP) . |
| 1222724 | 2/1971 | (GB) . |

* cited by examiner

Primary Examiner—Robert J. Sandy
(74) Attorney, Agent, or Firm—Robert J. Sandy

(57) ABSTRACT

The present invention provides a joiner for attaching items together, said joiner including a ring-like member having first and second ends to be linked to one another, said first end having a tubular section for reception therein of said second end, and a latching means to lock said first and second ends together.

4 Claims, 3 Drawing Sheets

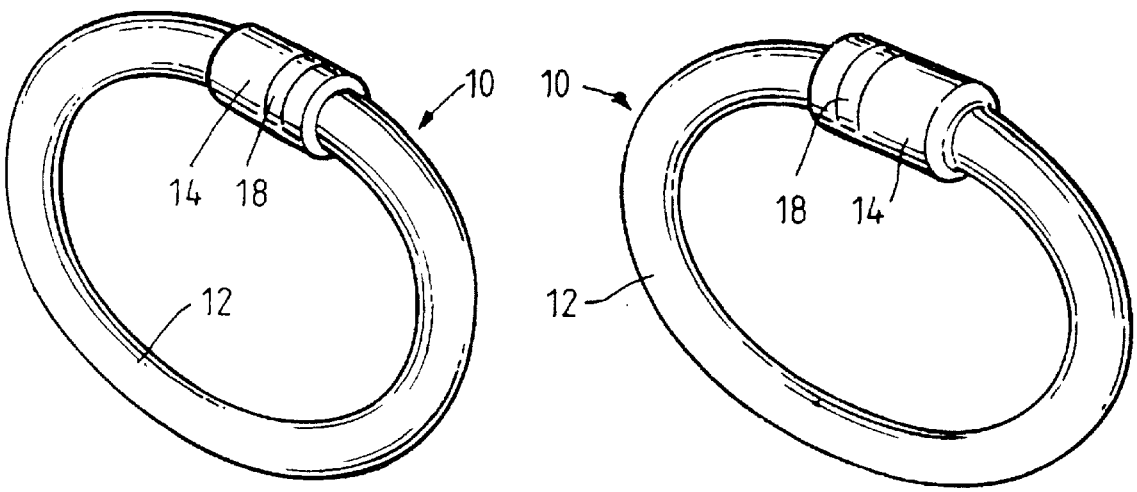
FIG. 1.
FIG. 2.
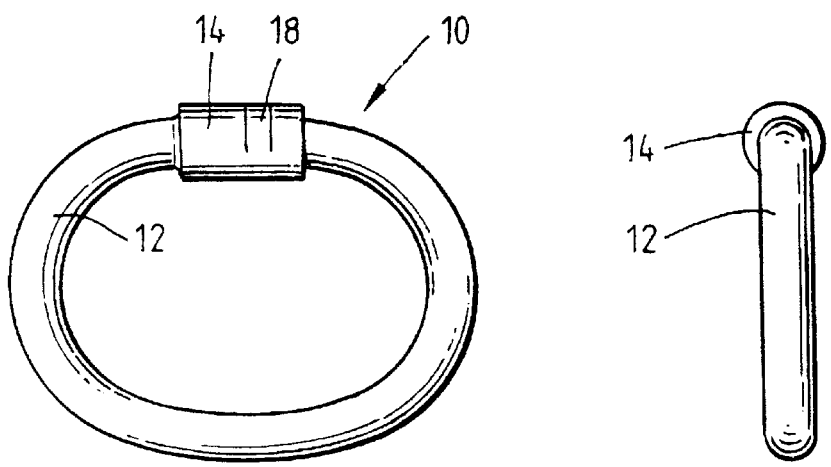
FIG. 3.
FIG. 4.
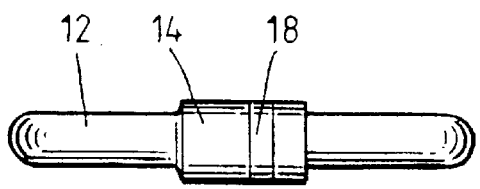
FIG. 5.

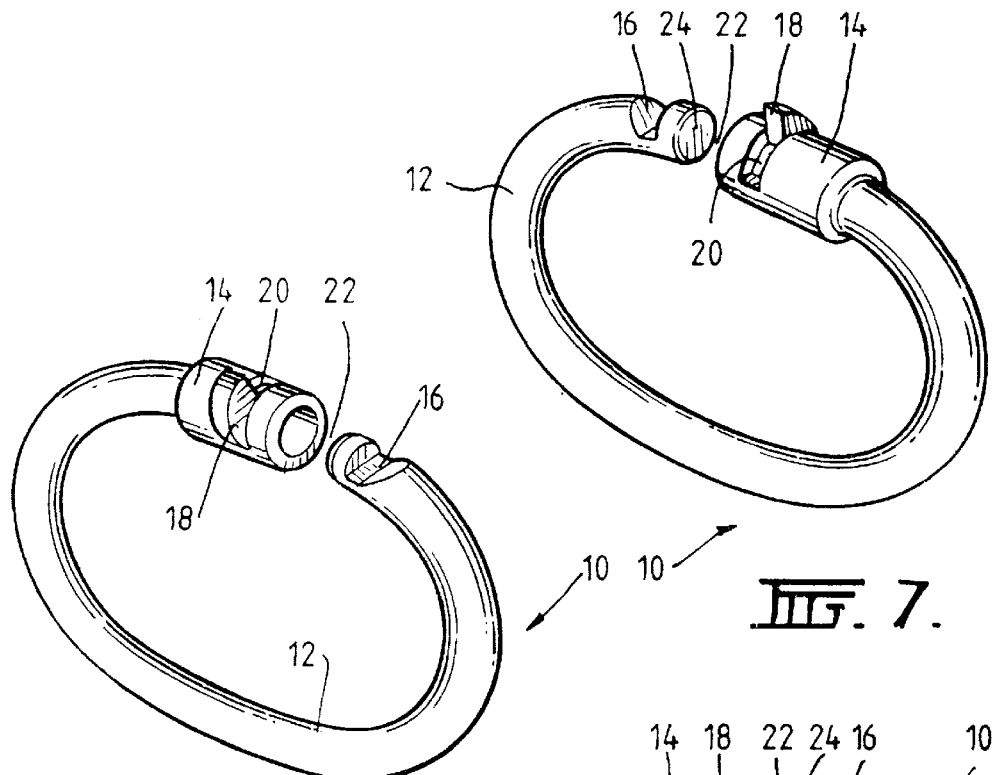
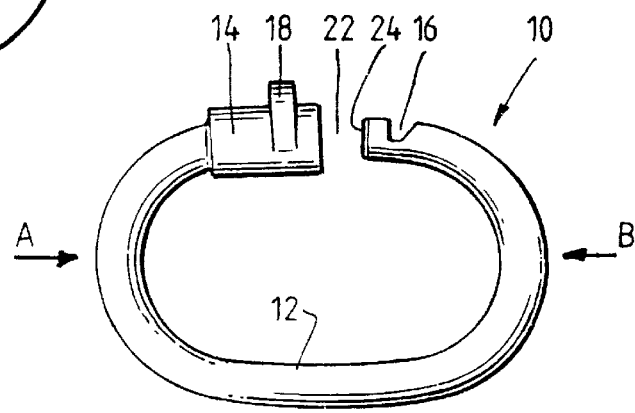
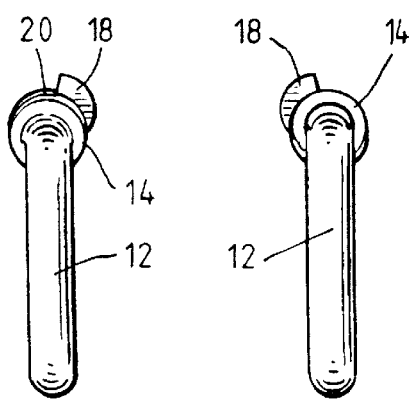
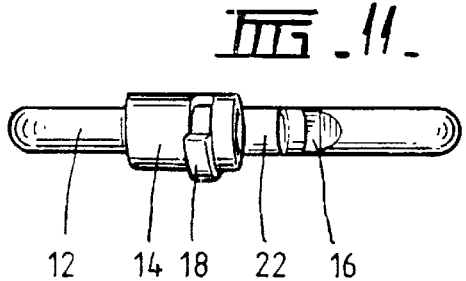

JOINER

TECHNICAL FIELD

This invention relates to a joiner and relates particularly, though not exclusively, to a joiner for attaching chains together, especially jewellery.

BACKGROUND ART

In the jewellery trade it is necessary to join the ends of the chain, bracelet or similar device together or add other attachments thereto. Typical of the joiners used are parrot clasps, bolt rings and jump rings.

Jump rings are split rings where the free ends are pressed together to close the gap between the free ends. Jump rings can be stretched over time allowing the gap to open and the chain to slip out.

Parrot clasps have a pivotal latch at one end and a jump ring threading bore on the main body at the other end. The parrot clasp has the disadvantages of greater cost, complicated assembly, weakness of the jump ring and accidental opening of the pivotal latch.

Bolt rings have a hollow ring with a slideable gate within the ring. They usually include a ring soldered to the hollow ring. The soldered ring is a point of weakness as is the slideable gate.

All of these devices suffer from a strength problem in that a sharp tug on the chain may cause the device to fail and allow the chain to be disconnected. Such a disconnection may result in loss of the chain.

It is an object of the present invention to provide a joiner, which is stronger than the above mentioned devices.

A further object of the invention is to provide a joiner that is simple to attach and requires no soldering or special tools.

SUMMARY OF THE INVENTION

With this and other objects in view the present invention provides a joiner for attaching items together, said joiner including a ring-like member having first and second ends to be linked to one another, said first end having a tubular section for reception therein of said second end, and a latching means to lock said first and second ends together.

PREFERRED ASPECTS OF THE INVENTION

Preferably said latching means includes a notch in said joiner adjacent said second end and a lug on said tubular section which cooperates with said notch to prevent withdrawal of said second end from said tubular section.

In a preferred embodiment said lug is attached to said tubular section and is adapted to be pushed through a slot in said tubular section to be located in said notch.

Preferably the exterior contour of said lug matches the exterior contour of said tubular section to provide a smooth surface when said lug is located in said notch.

In a further practical embodiment said joiner may be circular, elliptical or oval in shape in its latched position. However, in the most preferred embodiment, the joiner is oval in shape in its latched position.

BRIEF DESCRIPTION OF THE DRAWINGS

In order that the invention may be more readily understood and put into practical effect, reference will now be made to the accompanying drawings, in which:

FIG. 1 is a front perspective view of a joiner made in accordance with a first preferred embodiment of the invention showing the joiner in its closed and locked position.

FIG. 2 is a rear perspective view of the joiner shown in FIG. 1.

FIG. 3 is a front view of the joiner shown in FIG. 1.

FIG. 4 is an end view of the joiner shown in FIG. 1.

FIG. 5 is a plan view of the joiner shown in FIG. 1.

FIG. 6 is a similar view to that of FIG. 1 showing the joiner in its open and unlocked position.

FIG. 7 is a rear perspective view of the joiner shown in FIG. 6.

FIG. 8 is a front view of the joiner shown in FIG. 6.

FIG. 9 is an end view from "A" of the joiner shown in FIG. 8.

FIG. 10 is an end view from "B" of the joiner shown in FIG. 8.

FIG. 11 is a plan view of the joiner shown in FIG. 6.

DETAILED DESCRIPTION OF THE PREFERRED EMBODIMENT

Figure 12:
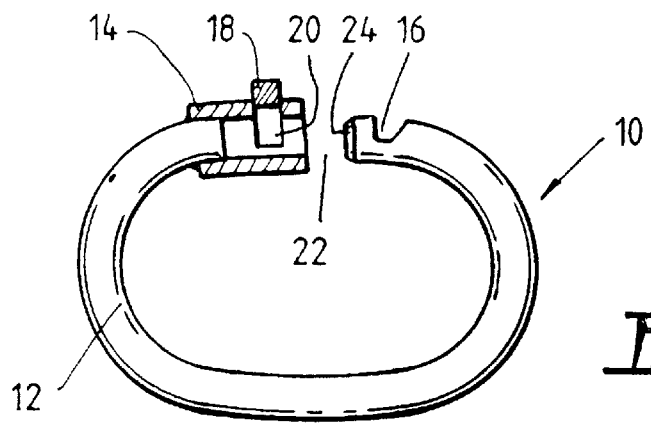
FIG. 12 is a longitudinal cross-sectional view of the joiner shown in FIG. 6.
Figure 13:
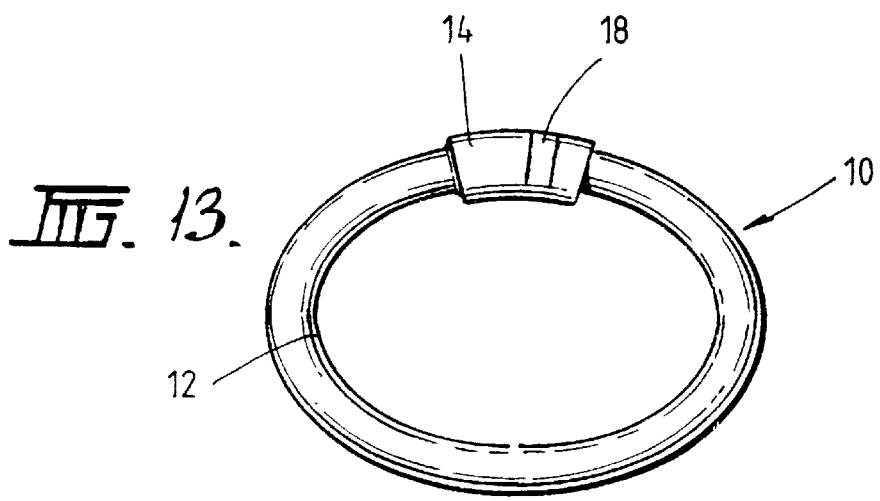
FIG. 13 a front view of a joiner made in accordance with a second preferred embodiment of the invention showing the joiner in its closed and locked position.
Figure 14:
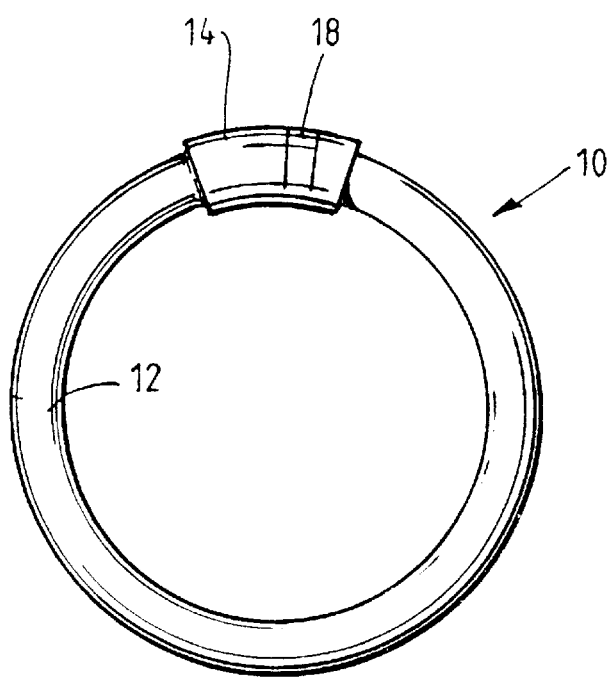
FIG. 14 is a front view of a joiner made in accordance with a third preferred embodiment of the invention showing the joiner in its closed and locked position.

In the drawings there is shown a joiner 10 for connecting the ends of a chain (not shown) together. The embodiment especially relates to the connecting of bracelets, chains, hanging items and similar jewellery but is not limited to that field. The invention is equally applicable to other forms of linking. Joiner 10 has a solid arcuate section 12 with a tubular section 14 attached at one end. Tubular section can be affixed to arcuate section 14 by adhesive, soldering or can be integrally formed therewith using a lost wax casting method. The use of this method allows a one-piece joiner to be manufactured. Adjacent the free end of arcuate section 12 is a notch 16 which will cooperate with a lug 18 on tubular section 14. Lug 18 in its unlatched and unlocked position is as shown in FIGS. 1 to 3. Lug 18 again can be integrally cast with joiner 10 or can be soldered or otherwise affixed to tubular section. A slot 20 is formed in tubular section 14 which cuts across tubular section 14 and opens into the interior of tubular section 14. Lug 18 will be at one end of slot 20.

In use, the items (not shown) to be linked are slid onto arcuate section 12 through gap 22. The free end 24 of arcuate section 12 is slipped into tubular section so that notch 16 is aligned with slot 20. Lug 18 is then pushed through slot 20 to engage notch 16. As seen in FIGS. 4 and 5 the exterior contour of lug 18 will provide a smooth surface with the exterior contour of tubular section 14 to provide a uniform joint. Lug 18 cannot be easily withdrawn from slot 14 which provides a permanent connection without soldering or special tools. Joiner 10 thus provides a very strong connection which resists pulling. The tubular section has an unbroken cylindrical distal end portion as shown in FIG. 6.

The preferred embodiment can be readily changed to suit requirements. The shape of the arcuate section 12 can be non circular e.g. triangular, square or any other shape. Arcuate section 12 need not be solid as it could also be a hollow tube. The joiner is not limited to its jewellery use as it could be used for other purposes e.g. attaching straps to a horse bridle. The joiner can be made from any suitable material e.g. precious metal, alloy, etc.

The invention will be understood to embrace many further modifications as will be readily apparent to persons skilled in the art and which will be deemed to reside within the broad scope and ambit of the invention, there having been set forth herein only the broad nature of the invention and a certain specific embodiment by way of example.

What is claimed is:

1. A joiner for attaching items together, said joiner including a ring-like member having first and second ends to be linked to one another, said first end comprising a tubular section having an unbroken cylindrical distal end portion thereof for reception therein of said second end and a latching means to lock said first and second ends together, wherein said latching means includes a notch in said joiner adjacent to said second end and a lug on said tubular section which cooperates with said notch to prevent withdrawal of said second end from said tubular section, wherein an exterior contour of said lug matches an exterior contour of said tubular section to provide a smooth surface when said lug is located in said notch.

2. A joiner as claimed in claim 1, wherein said lug is attached to said tubular section and is adapted to be pushed through a slot in said tubular section to be located in said notch.

3. A joiner as claimed in claim 1, wherein said joiner is circular, elliptical or oval in shape in its latched position.

4. A joiner as claimed in claim 3, wherein said joiner is oval in shape in its latched position.

\* \* \* \* \*